United States Patent [19]
Jennings et al.

[11] 3,736,732
[45] June 5, 1973

[54] AUXILIARY DRIVE SYSTEM FOR COMBINES

[75] Inventors: Mearl James Jennings, Bernard Francis Vogelaar, Kenneth Robert Lamp, all of Moline, Ill.

[73] Assignee: Deere & Company, Moline, Ill.

[22] Filed: Oct. 12, 1971

[21] Appl. No.: 188,340

[52] U.S. Cl. .................... 56/10.9, 56/11.1, 56/11.2, 56/11.8, 56/11.9, 180/44 F
[51] Int. Cl. .............................................. A01d 41/02
[58] Field of Search.................... 56/10.9, 11.1, 11.2, 56/11.8, 11.9; 180/44 R, 44 F, 45, 46, 47; 60/53 R

[56] References Cited
UNITED STATES PATENTS

| | | | |
|---|---|---|---|
| 3,481,419 | 12/1969 | Kress et al. | 180/44 F |
| 2,431,719 | 12/1947 | Wilkin | 180/44 F X |
| 3,506,081 | 4/1970 | Rumsey | 180/44 F |

Primary Examiner—Robert Peshock
Assistant Examiner—J.A. Oliff
Attorney—H. Vincent Harsha, Harold M. Knoth, William A. Murray et al.

[57] ABSTRACT

The steerable rear wheels of a hydraulically driven combine are provided with hydraulic motors which are connected in parallel with each other and in parallel with the motor for the main drive wheels. A directional flow control valve permits the hydraulic motors for the steerable wheels to be optionally connected and disconnected from the main pump. Pressure compensated flow control valve means limit the maximum flow of fluid to the hydraulic motors for the steerable rear wheels. When the rear wheel drive system is in use, the torque applied to the steerable rear wheels is proportional to the torque applied to the main drive wheels and spin-out of either one or both of the steerable rear wheels will not result in loss of power to the main drive wheels. Also, by varying the ratio of the transmission interconnecting the main hydraulic motor with the main drive wheels, the ratio of the torque applied to the main drive wheels to the torque applied to the steerable rear wheels will be varied.

9 Claims, 2 Drawing Figures

PATENTED JUN 5 1973

3,736,732

INVENTORS.
M. J. JENNINGS
B. F. VOGELAAR
K. R. LAMP
BY
R L Hollister
ATTORNEY

AUXILIARY DRIVE SYSTEM FOR COMBINES

BACKGROUND OF THE INVENTION

The present invention relates generally to hydraulic drive systems, and more specifically relates to an auxiliary hydraulic drive system for an agricultural combine.

Generally, a combine with which the present invention concerns itself comprises a vehicle body supported on a pair of main traction wheels and a pair of rear sterable wheels. Under most conditions, the ma drive wheels provi a value to propel a combine. However, when working the auxiliary conditions, the main drive wheels may spin out and not provide the tractive force necessary. This is particularly true in the case of combines wherein the weight of grain in the grain tank varies to a considerable extent and may vary, by more than two to one, the weight on the rear sterrable wheels.

As the weight of the rear steerable wheels increases and the main drive wheels become unable to provide sufficient tractive force, it is desirable to drive the steerable rear wheels to provide the additional force necessary to propel the combine.

SUMMARY OF THE INVENTION

It is a principal object of the present invention to provide an auxiliary drive system for a combine which provides a torque for the steerable rear wheels which is proportional to the torque applied to the main drive wheels so that the torque potential to the steerable wheels can be relatively high with little tendency to spin out since torque requirement and weight for traction both vary as the combine grain tank fills.

Another object of the present invention is to provide an auxiliary hydraulic drive system for the rear wheels of a combine which provides a torque to the steerable rear wheels which is proportional to the torque applied to the main drive wheels and which limits the maximum flow of fluid to the rear wheel motors so that spin-out of either one or both of the rear wheels will not cause loss of power to the main drive wheels.

Yet another object of the present invention is to provide an auxiliary hydraulic drive system for a vehicle in which the main drive wheels are driven by a hydraulic motor connected to the main drive wheels by a variable ratio transmission in which the torque applied to the steerable rear wheels is proportional to the torque applied to the main drive wheels and in which the ratio of the torque applied to the rear wheels to the torque applied to the main wheels can be varied by changing the ratio of the transmission.

The above objects and additional objects and advantages will become apparent to those skilled in the art from a reading of the following detailed description of a preferred embodiment of the invention when taken in conjunction with the accompanying drawing.

DESCRIPTION OF THE PREFERRED EMBODIMENT

Figure 2:
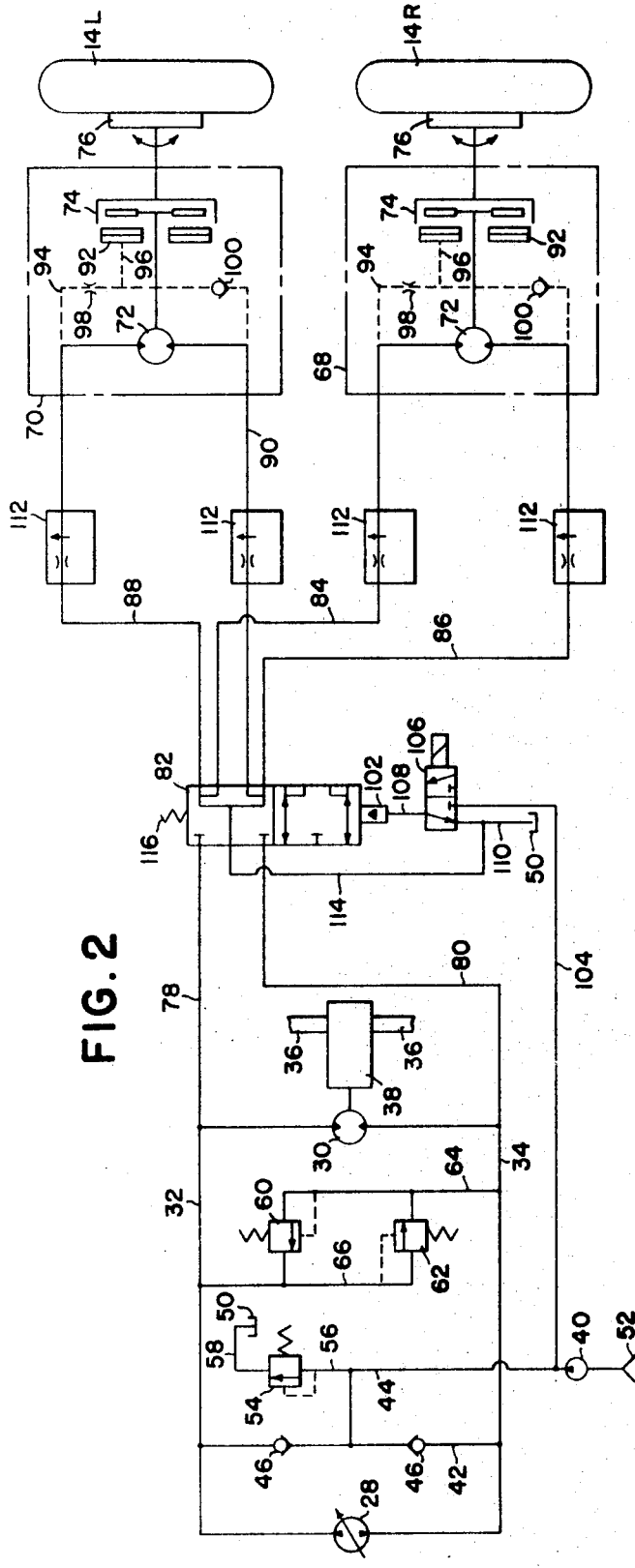
Figure 1:
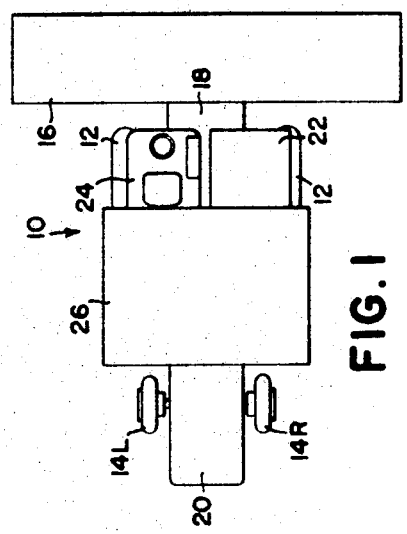
FIG. 1 is a top plan view of a combine to which the hydrostatic drive system according to the present invention has been applied; and, FIG. 2 is a schematic illustration of the main drive system and the auxiliary drive system for the combine illustrated in FIG. 1.

With reference to the drawing, the indicated generally at 10 includes a pair of main drive wheels 12 and a pair of rear steerable wheels 14L and 14R. A header or platform 16 is carried forwardly of the main drive wheels 12 by a feeder housing 18 which delivers crop gathered by the header 16 to the threshing unit 20. The combine also includes an internal combustion engine 22, an operator's station 24 and a grain tank 26 for temporary storage of grain which has been harvested. The grain tank 26 is normally situated between the main drive wheels 12 and rear steerable wheels 14 so that as the nk is filled, the added weight is distributed between the front and rear wheels. Depending on the size of the grain tank, the weight added to the rear wheels can more than double the empty weight on the rear wheels.

The drive system for the main drive wheels 12 includes a variable displacement, reversible delivery, pump 28 and a reversible hydraulic motor 30. The opposite sides of the pump 28 and motor 30 are interconnected by fluid lines 32 and 34 which alternately act as supply and return lines depensing upon which direction the pump 28 supplies the fluid pressure. The pump 28 is driven by the engine 22 in any conventional manner, and the motor 30 is interconnected with the axles 36 for the main drive wheels 12 through a variable ratio transmission and differential unit 38.

The pump 28, motor 30 and fluid lines 32 and 34 are initially filled by charge pump 40. The fluid lines 32 and 34 are interconnected by a fluid line 42, and the charge pump 40 is connected to the fluid line 42 by an additional fluid line 44. A pair of check valves 46 in the fluid line 42 prevent the flow of fluid from either the lines 32 or 34 to the fluid line 44 but permit flow of fluid in the opposite direction. The charge pump 40 initially fills the system and also makes up for any fluid leakage by delivering fluid from a reservoir 50 through a filter 52 to the fluid lines 32 and 34.

A relief valve 54 is connected to the fluid line 44 by a fluid line 56 and returns fluid to the reservoir 50 through a fluid line 58 to maintain a predetermined pressure within the fluid line 44. The pressure in the fluid lines 32 and 34 is also limited by a pair of relief valves 60 and 62. The high pressure side of the relief valve 60 and the low pressure side of the relief valve 62 are interconnected with the fluid line 34 by a fluid line 64 and the high pressure side of the valve 62 and the low pressure side of the valve 60 are interconnected with the fluid line 32 by an additional fluid line 66. With these connections, excess pressure in the fluid line 32 will be exhausted through the valve 62 and fluid line 64 to the fluid line 34 and excess pressure in the fluid line 34 will be exhausted through the valve 60 and fluid line 66 to the fluid line 32.

The auxiliary drive system for the steerable rear wheels 14 includes a pair of right- and left-hand hydrostatic drive units 68 and 70 which are of similar construction. Each of the hydrostatic drive units includes a reversible hydraulic motor 72 and a clutch 74. The motors 72 of the hydrostatic drive units 68 and 70 are connected to reduction gear units or transmissions 76 associated with the wheels 14R and 14L, respectively, through the clutches 74.

The hydrostatic drive units 68 and 70 are powered from the main pump 28, and to this end a pair of fluid lines 78 and 80 are connected to the fluid lines 32 and 34 respectively and to one side of a directional control valve 82, and a second side of the directional control valve 82 is interconnected with the two sides of the motor 72 of the hydrostatic drive unit 68 by a pair of fluid lines 84 and 86 and to the two sides of the motor 72 of the hydrostatic drive unit 70 by a pair of fluid lines 88 and 90. The valve 82 is essentially an on-off valve for connecting and disconnecting the auxiliary drive system with and from the main drive system. Internally of the valve 82 the fluid lines 84 and 88 are interconnected and the fluid lines 86 and 90 are interconnected so that the hydrostatic drive units 68 and 70 are connected in parallel with each other and, when the valve 82 is in the "on" position, the hydrostatic drive units 68 and 70 are connected in parallel with the main drive motor 30.

The clutch 74 of each of the hydrostatic drive units 68 and 70 is controlled by a pressure responsive brake 92 which is interconnected with the fluid lines for its respective hydraulic motor 72 by hydraulic lines 94 and 96. Each of the hydraulic lines 94 is provided with a restriction 98 and a check valve 100. The restriction 98 and check valve 100 are placed in the fluid line 94 such that, when the respective motor 72 is driven in a forward direction, the restriction 98 will be upstream of the connection between the fluid lines 94 and 96 and the check valve 100 will prevent the flow of fluid completely through the fluid line 94 and around the respective motor 72. During reverse operation of the motor 72, the check valve will permit fluid to flow through the fluid lines 94, but the restriction 98 will provide sufficient pressure in the fluid line 96 to engage the clutch 74. A more complete description of the hydrostatic drive units 68 and 70 can be had by referring to U.S. Pat. No. 3,481,419 which issued to Kress et al. on Dec. 2, 1969.

The valve 82 is hydraulically actuated and to this end is provided with a small cylinder 102 which is connected to the charge pump 40 through a fluid line 104, a solenoid-actuated control valve 106 and a fluid line 108. The solenoid-actuated control valve 106 is also connected to the reservoir 50 by a fluid line 110. The controls for the solenoid valve 106 will be placed in a convenient spot at the operator's station 24 of the combine so that the operator can selectively engage and disengage the auxiliary drive system while the combine is in use.

When the valve 82 is in the "off" position, it interconnects the fluid lines 84-90 with an additional fluid line 114 which is connected to the reservoir 50. The purpose of the fluid line 114 will be explained hereinafter in the description of operation.

A pressure-compensated flow control valve 112 is interposed in each of the fluid lines 84-90 so that the flow of fluid to each of the hydrostatic units 68 and 70 is limited to a maximum predetermined value in both the forward and reverse directions.

The operation of the above-described drive system is as follows. Assuming that the directional control valve 82 is in the "off" position, the operator controls the movement of the combine by selecting a ratio of the transmission 38 and by controlling the displacement and direction of displacement of the pump 28. If the main drive wheels 12 have insufficient traction to propel the combine 10, the operator can connect the auxiliary drive system with the main drive system by actuating the solenoid valve 106. When the solenoid valve 106 is actuated, it interconnects the charge pump 40 with the actuating cylinder 102 for the directional control valve 82 which moves the valve 82 to the "on" position. Assuming that the fluid line 32 is the supply line when the combine is driven in a forward direction, movement of the valve 82 to the "on" position pressurizes the lines 84 and 88 to drive the motors 72 of the hydrostatic drive units 68 and 70. As the lines 84 and 88 are pressurized, fluid flows into the lines 94, through the restrictions 98 and through the lines 96 to pressurize the brakes 92 and engage the clutches 74. The check valves 100 prevent fluid from completely bypassing the motors 72.

With the motors 72 connected in parallel with the main drive motor 30, the torque applied to the steering wheels is proportional to the torque applied to the main drive wheels and by proper selection of steering wheel motor displacement and steering wheel reduction transmissions, the torque potential for the steering wheels can be made quite high since the torque requirement for propelling the vehicle and the weight for traction both vary as the grain tank 26 is filled. For example, when the grain tank 26 is empty, there is relatively little weight on the steering wheels 14 and they will have relatively little traction. However, when the grain tank 26 is empty, the torque requirement for driving the combine is relatively small. As the grain tank 26 is filled, the torque requirement to propel the combine increases, but the weight on the rear steering wheels and hence the traction of the rear steering wheels increases so that the rear steering wheels can provide more driving power without spinning out. If the steering wheels tend to lose traction, the transmission 38 can be shifted to a lower gear which will produce a decreased ratio of steering wheel rim pull to main drive wheel rim pull, thus reducing the tendency of the steering wheels to lose traction. If, due to a heavy steering wheel zxle load, the main drive wheels lose traction first, the transmission can be shifted to a higher gear which will increase the ratio of steering wheel rim pull to main drive wheel rim pull, thus reducing the tendency for the main drive wheel to lose traction.

If one of the steering wheels should lose traction and spin out, the pressure-compensated control valve 112 in its supply line will limit the flow of fluid to the motor for that wheel so that the wheel and its hydraulic motor will not exceed its safe speed and forward travel of the combine will not be stopped due to pressure loss in the other wheel motors. The pressure-compensated flow control valves 112 in effect act as brakes if their respective wheel should spin out since a spin-out will cause a pressure drop across the valve 112 and, as the pressure drop across the valve 112 increases, the flow through that valve will be limited to the maximum setting of the valve. Thus, by increasing the displacement of the pump 28, the pressure in the system can be increased without causing a corresponding increase in the flow through the valve 112.

If spin-out of the main drive wheel occurs, either one or both can be braked which will increase the system pressure up to the setting of the relief valve 62 which increases the pressure to the rear wheel motors 72 which increases the torque applied to the rear wheels 14.

When the combine is driven rearwardly by reversing the direction of displacement of the pump 28, the fluid lines 34, 86 and 90 are the supply lines and the motors 30 and 72 are driven in the opposite direction. When the fluid lines 86 and 90 are the supply lines for the motors 72 of the hydrostatic units 68 and 70, fluid flows past the check valves 100 in the fluid lines 94, but the restrictions 98 in the fluid lines 94 provide sufficient pressure in the fluid line 96 to apply the clutch brakes 92.

When the combine is driven in the reverse direction, the pressure-compensated flow control valves 112 in the fluid lines 86 and 90 serve the same function as do the pressure-compensated flow control valves in the fluid lines 84 and 88 when the combine is driven in the forward direction. By using the four individual pressure-compensated flow control valves 112, the maximum flow to each hydrostatic unit 68 and 70 is limited in both directions of travel of the combine. Since it is common in hydraulically driven vehicles to limit the speed in the reverse direction by limiting the displacement of the pump in the reverse direction, the flow control valves 112 in the fluid lines 86 and 90 are made to limit the maximum flow through the fluid lines 86 and 90 to a value less than the maximum flow permitted in the fluid lines 84 and 88 by the flow control valves 112 in the fluid lines 84 and 88.

When the operator desires to disengage the auxiliary drive system, he merely deactivates the solenoid valve 106 which drains the fluid from the cylinder 102 for the valve 82 through the fluid lines 108 and 110 to the reservoir 50 and a spring 116 returns the valve 82 to its "off" position. When the valve 82 is in its "off" position, the fluid lines 84 through 90 are interconnected to the reservoir 50 through the fluid line 114 so that fluid in the hydrostatic drive units 68 and 70 is drained to ensure that the brakes 92 are released and the hydrostatic drive units 68 and 70 do not act as brakes on the rear wheels 14.

Although only a single preferred embodiment of the invention has been described and illustrated, various modifications within the spirit and scope of the invention will become apparent to those skilled in the art and can be made43 without departing from the underlying principles f the invention. Therefore, the invention should not be limited to the specific illustration and disclosure, but only by the following claims.

We claim:

1. In a combine having a pair of main drive wheels, a pair of steerable wheels, a hydraulic motor, a variable ratio transmission interconnecting the hydraulic motor and the main drive wheels, and a variable displacement pump for driving the hydraulic motor, a variable torque auxiliary drive system for the sterrable wheels comprising: a pair of auxiliary hydraulic motors operably connected to and for driving the steerable wheels; fluid line means connecting the auxiliary hydraulic motors with the pump in parallel relation with the first-mentioned hydraulic motor and in parallel relation with each other; and pressure-compensated flow control means limiting the maximum flow to each of the auxiliary motors whereby the torque applied to the steerable wheels will be proportional to the torque applied to the main drive wheels and lo otractiff one steerable wheel will not result in loss of power to the main drive wheels.

2. In a combine for harvesting grain crops having means for gathering and threshing grain, a grain tank for temporay storage of the grain, a pair of main drive wheels, a pair of steerable wheels, a main reversible hydraulic motor, transmission means interconnecting the main hydraulic motor and the main drive wheels, a variable displacement, reversible delivery, pump, and a first pair of fluid lines interconnecting the two sides of the pump with the two sides of the main motor, an auxiliary drive system for the steerable wheels comprising: a pair of auxiliary reversible hydraulic motors individually connected to the pair of steerable wheels through individual transmission means; second and third pairs of fluid lines interconnecting the two sides of the pair of auxiliary hydraulic motors with the first pair of fluid lines to connect the pair of auxiliary hydraulic motors with the hydraulic pump in parallel with the main hydraulic motor and in parallel with each other; and pressure-compensated flow control valve means interposed in each fluid line of the second and third pairs of fluid lines limiting the maximum fluid flow to each of the auxiliary hydraulic motors whereby the torque applied to the steerable wheels will be proportional to the torque applied to the main drive wheels and loss of traction of either one or both of the steerable wheels will not result in loss of power to the main drive wheels.

3. The invention set forth in claim 2 wherein the flow control valve means limit the maximum fluid flow to the auxiliary hydraulic motors in a direction to drive the auxiliary hydraulic motors forwardly to a value greater than the maximum fluid flow to the auxiliary hydraulic motors in a direction to drive the auxiliary hydraulic motors rearwardly.

4. An auxiliary drive system for a vehicle having a pair of main drive wheels, a pair of steerable wheels, a main reversible hydraulic motor, variable ratio transmission means interconnecting the main hydraulic motor with the main drive wheels, a variable displacement, reversible delivery, pump, and a pair of fluid lines intercnnecting the two sides of the main motor with the pump, the auxiliary drive system comprising: a pair of reversible auxiliary hydraulic motors individually connected to the pair of steerable wheels, a directional control valve having alternate on and off positions; second and third pairs of fluid lines connecting the two sides of the auxiliary hydraulic motors to one side of the directional control valve in parallel relationship to each other; a fourth pair of fluid lines interconnecting the second side of the directional control valve with the first pair of fluid lines so that the auxiliary hydraulic motors are connected in parallel with the main hydraulic motor when the directional control valve is in the on position; and a pressure-compensated flow control valve means interposed in each of the fluid lines of the second and third pairs of fluid lines limiting the maximum flow of fluid to each of the auxiliary hydraulic motors; whereby, by manipulation of the directional control valve, the auxiliary drive system can be cut in and out at will, the torque applied to the steerable wheels will be proportional to the torque applied to the main drive wheels when the directional control valve is in the on position, loss of traction of either one or both of the steerable wheels will not result in loss of power to the main drive wheels, and, by changing the ratio of the variable ratio transmission, the ratio of main drive wheel torque to steerable wheel torque can be varied.

5. The auxiliary drive system set forth in claim 4 wherein the flow control valve means limit the maximum fluid flow to the auxiliary hydraulic motors in a direction to drive the auxiliary hydraulic motors forwardly to a value greater than the maximum fluid flow to the auxiliary hydraulic motors in a direction to drive the auxiliary hydraulic motors rearwardly.

6. The auxiliary drive system set forth in claim 4 wherein the directional control valve interconnects the second and third pair of fluid lines with a fluid reservoir when in the off position to thereby prevent the auxiliary hydraulic motors from braking the vehicle.

7. In a crop harvester having a pair of forward main drive wheels, a pair of rear steerable wheels, a hydraulic motor, a variable ratio transmission interconnecting the hydraulic motor and the main drive wheels, and a variable displacement pump or driving the hydraulic motor, a variable torque auxiliary drive system for the rear steerable wheels comprising: a pair of auxiliary hydraulic motors operatively connected to and for driving the steerable wheels; fluid line means connecting the auxiliary hydraulic motors with the pump in parallel relation with the first-mentioned hydraulic motor and in parallel relation with each other, and pressure compensated flow control means limiting the maximum flow to each of the auxiliary motors whereby the torque applied to the main drive wheels and loss of traction to one of the steerable wheels will not result in loss of power to the main drive wheels.

8. In a crop harvester having a pair of main drive wheels, a pair of steerable wheels, a main reversible hydraulic motor, transmission means interconnecting the main hydraulic motor and the main drive wheels, a variable displacement, reversible delivery, pump, and a first pair of fluid lines interconnecting the two sides of the pump with the two sides of the main motor, an auxiliary drive system for the steerable wheels comprising: a pair of auxiliary reversible hydraulic motors individually connected to the pair of steerable wheels through individual transmission means; second and third pairs of fluid lines interconnecting the two sides of the pair of auxiliary hydraulic motors with the first pair of fluid lines to connect the pair of auxiliary hydraulic motors with the hydraulic pump in parallel with the main hydraulic motor and in parallel with each other; and pressure compensated flow control valve means interposed in each fluid line of the second and third pairs of fluid lines limiting the maximum fluid flow to each of the auxiliary hydraulic motors whereby the torque applied to the steerable wheels will be proportional to the torque applied to the main drive wheels and loss of traction to either one or both of the steerable wheels will not result in loss of power to the main drive wheels.

9. In a crop harvester having a pair of main drive wheels, a pair of steerable wheels, a main reversible hydraulic motor, a variable ratio transmission interconnecting the main hydraulic motor and the main drive wheels, and a variable displacement, reversible delivery, pump for driving the hydraulic motor, a variable torque auxiliary drive system for the rear steerable wheels comprising: a pair of auxiliary reversible hydraulic motors operatively connected to and for driving the steerable wheels; directional flow control valve means having alternate on and off positions; and fluid line means interconnecting one side of the valve means with the auxiliary hydraulic motors and a second side of the valve means with the pump in parallel relation with the main hydraulic motor so that when the valve means is in the on position the torque applied to the steerable wheels will be proportional to the torque applied to the main drive wheels, and, by changing the ratio of the variable ratio transmission, the ratio of main drive wheel torque to steerable wheel torque can be varied.

* * * * *